(12) United States Patent
Shi

(10) Patent No.: US 7,784,728 B2
(45) Date of Patent: Aug. 31, 2010

(54) ROTATION CONTROL DEVICE FOR PET LEASH

(76) Inventor: Fuyou Shi, No. 11, Bolian Road, Qiubin Industrial Zone, Jinhua, Zhejiang Province (CN) 321026

( * ) Notice: Subject to any disclaimer, the term of this patent is extended or adjusted under 35 U.S.C. 154(b) by 8 days.

(21) Appl. No.: 12/115,560

(22) Filed: May 6, 2008

(65) Prior Publication Data

US 2009/0277398 A1    Nov. 12, 2009

(51) Int. Cl.
*B65H 75/30* (2006.01)

(52) U.S. Cl. ..................... 242/385.4; 119/796

(58) Field of Classification Search ............... 242/385, 242/385.4, 396, 396.1, 396.2, 396.3, 396.5, 242/396.6, 396.7, 396.8, 405, 405.3; 119/772, 119/775, 776, 792–798
See application file for complete search history.

(56) References Cited

U.S. PATENT DOCUMENTS

| | | | | |
|---|---|---|---|---|
| 4,856,726 A * | 8/1989 | Kang | ....................... | 242/385.4 |
| 5,377,626 A * | 1/1995 | Kilsby et al. | ................. | 119/796 |
| 5,483,926 A * | 1/1996 | Bogdahn | .................. | 242/385.4 |
| 6,148,773 A * | 11/2000 | Bogdahn | ..................... | 119/796 |
| 6,526,918 B1 * | 3/2003 | Arnold | ........................ | 119/796 |
| 6,694,922 B2 * | 2/2004 | Walter et al. | ................. | 119/772 |
| 7,036,459 B1 * | 5/2006 | Mugford et al. | ............. | 242/405 |
| 7,168,393 B2 * | 1/2007 | Bogdahn et al. | ............. | 119/796 |

\* cited by examiner

*Primary Examiner*—William A Rivera

(57) ABSTRACT

A rotation control device for pet leash includes a casing, a cover, and a wheel disposed in the casing. The casing includes a locking button, an unlocking button, and a self lock slider connected with a locking spring, an unlocking spring, and a self lock spring respectively. The unlocking button has an unlocking retaining hole having a position corresponding to an unlocking column on the casing. The unlocking button includes an unlocking retaining pole is inserted into an unlocking sliding groove of the casing. The locking button has a locking retaining rectangular hole having a position corresponding to a locking column on the casing. The self lock slider includes a self lock retaining pole is inserted into a self lock sliding groove in the casing, wherein the self lock retaining pole is against an unlocking retaining pole.

1 Claim, 3 Drawing Sheets

ROTATION CONTROL DEVICE FOR PET LEASH

BACKGROUND OF THE PRESENT INVENTION

1. Field of Invention

The present invention relates to a pet leash, and more particularly to a rotation control device connected to a pet leash for locking and unlocking the winding machine of pet leash.

2. Description of Related Arts

The pet leash includes a rotation control device, which can lock and unlock the winding machine of the pet leash. In order to lock the winding machine, the present winding machine of the pet leash needs to press a locking button, and needs to press another auxiliary button to finish the locking process. Therefore two actions must be cooperated to lock the winding machine of the pet leash, which is inconvenient for the user.

SUMMARY OF THE PRESENT INVENTION

An object of the present invention is to provide a rotation control device for pet leash, which overcomes the above mentioned drawback, and is convenient for use.

Accordingly, in order to accomplish the above object, the present invention provides a rotation control device for pet leash, which comprises a casing, a cover, and a wheel disposed in the casing. A locking button, an unlocking button, and a self lock slider are provided on the case, and are connected with a locking spring, an unlocking spring, and a self lock spring respectively. The unlocking button has an unlocking retaining hole having a position corresponding to an unlocking column on the casing.

The unlocking button comprises an unlocking retaining pole, which is inserted into an unlocking sliding groove of the casing. The locking button has a locking retaining rectangular hole having a position corresponding to a locking column on the casing. The self lock slider comprises a self lock retaining pole, which is inserted into a self lock sliding groove in the casing, wherein the self lock retaining pole is against an unlocking retaining pole.

The locking button, the unlocking button, and the self lock slider are capable of removing within a predetermined distance. After the locking button is pressed, the self lock slider locks the locking button, so as to lock the pet leash. After the unlocking button is pressed, the unlocking button pushes the self lock slider to unlock the unlocking button, so as to unlock the pet leash. During the operation, the springs are rebounded repeatedly.

Therefore, using the present invention, the user presses the locking button to lock the pet leash, and presses the unlocking button to unlock the pet leash, which is reasonable, simple and convenient.

These and other objectives, features, and advantages of the present invention will become apparent from the following detailed description, the accompanying drawings, and the appended claims.

DETAILED DESCRIPTION OF THE PREFERRED EMBODIMENT

Figure 1:
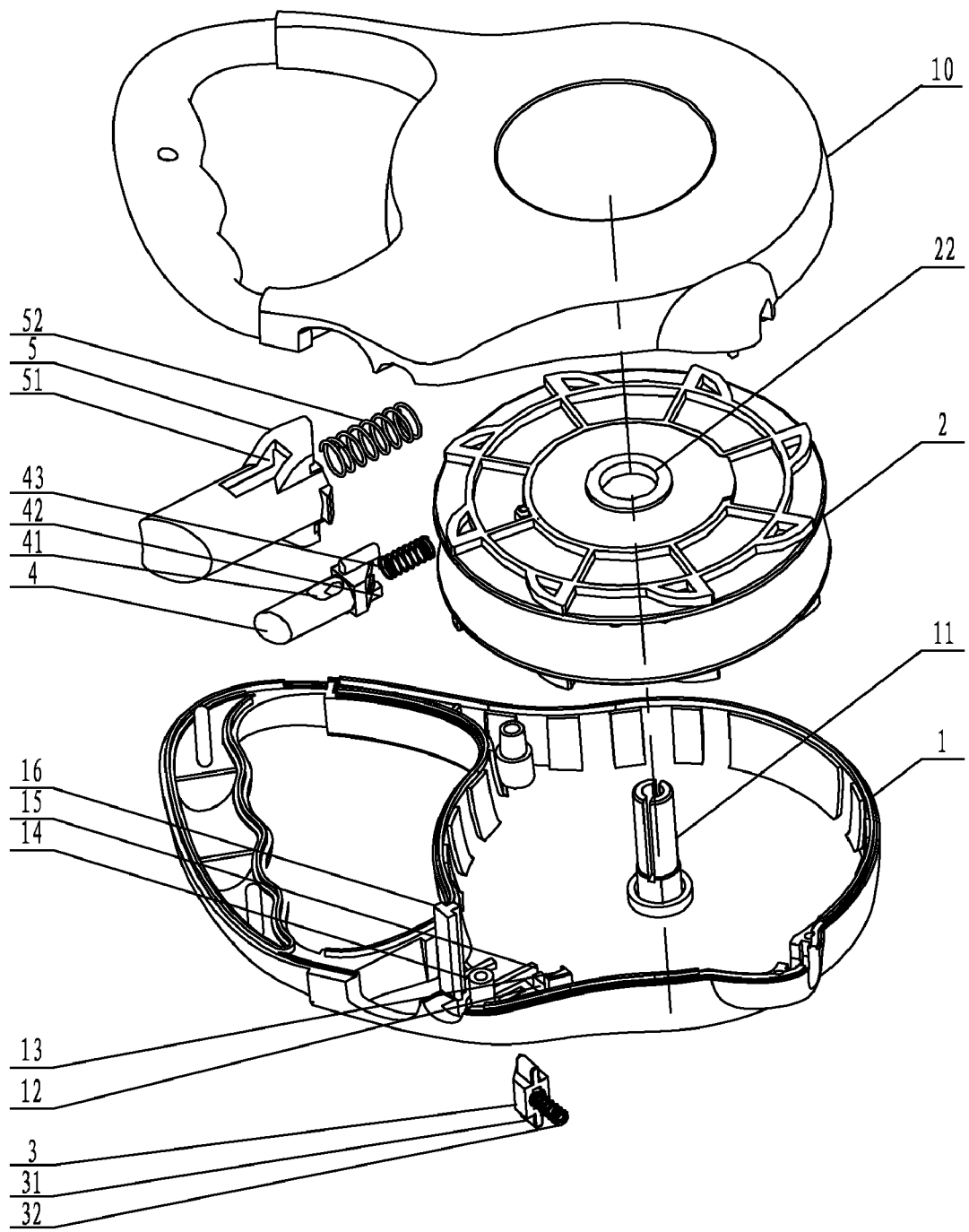
FIG. 1 is an exploded perspective view of a rotation control device for pet leash according to a preferred embodiment of the present invention.

Referring to FIG. 1 of the drawings, a rotation control device for pet leash according to a preferred embodiment of the present invention is illustrated, in which the rotation control device for pet leash comprises a casing 1, a cover 10 and a wheel 2 disposed in the casing. A locking button 5, an unlocking button 4, and a self lock slider 3 are provided on the case 1, and are connected with a locking spring 52, an unlocking spring 43, and a self lock spring 32 respectively. The unlocking button 4 has an unlocking retaining hole 41 having a position corresponding to an unlocking column 14 on the casing.

The unlocking button comprises an unlocking retaining pole 42, which is inserted into an unlocking sliding groove 15 of the casing 1. The locking button 5 has a locking retaining rectangular hole 51 having a position corresponding to a locking column 16 on the casing 1. The self lock slider 3 comprises a self lock retaining pole 31, which is inserted into a self lock sliding groove 12 in the casing 1, wherein the self lock retaining pole 31 is against an unlocking retaining pole 42.

Figure 2:
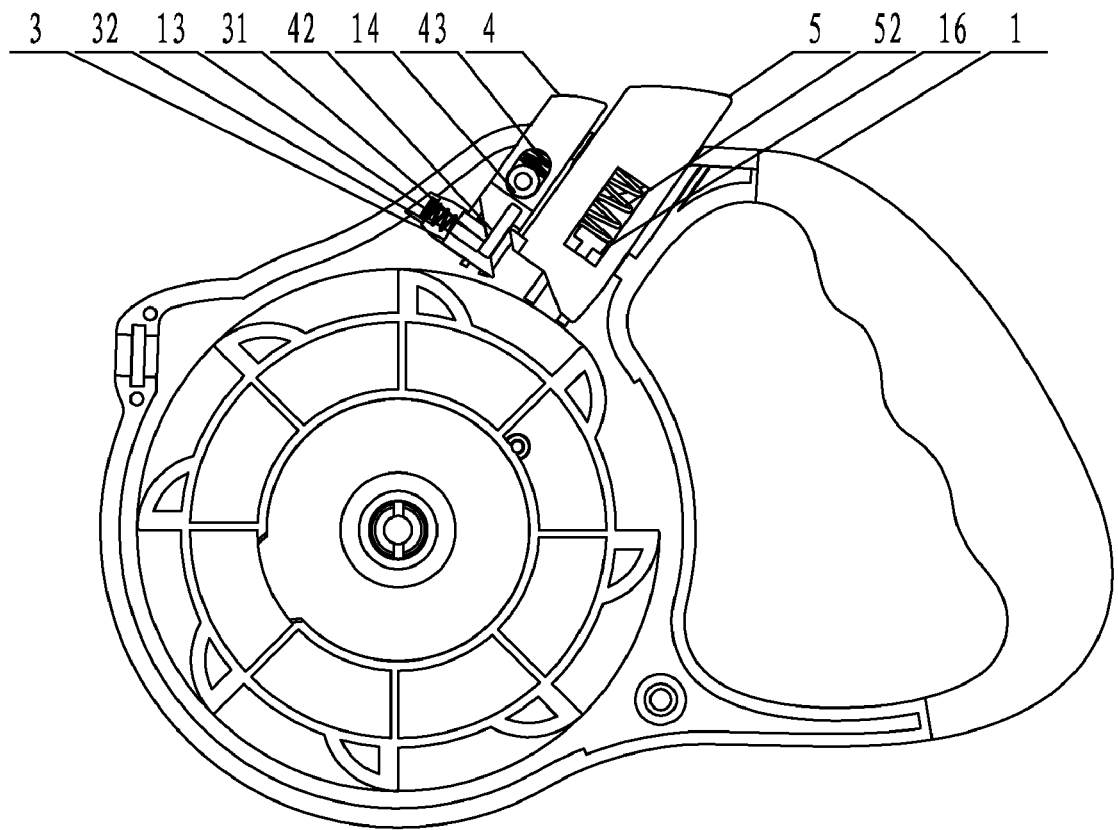
FIG. 2 is a perspective view of a rotation control device for pet leash according to the above preferred embodiment of the present invention.

As shown in FIG. 1 and FIG. 2 of the drawings, the locking spring 52 is disposed in locking button 5, the locking retaining rectangular hole 51 receives the locking column 16 of the casing 1, and the locking spring 52 is against the locking column 16 at one end. The unlocking spring 43 is disposed in unlocking button 4, the unlocking retaining hole 41 receives the unlocking column 14 of the casing 1, and the unlocking spring 43 is against the locking column 14 at one end. And the unlocking retaining pole 42 is inserted into an unlocking sliding groove 15 of the casing 1 to ensure the unlocking button 4 moving smoothly. The self lock spring 32 is disposed into the self lock slider 3. The self lock retaining pole 31 of the self lock slider 3 is inserted into a self lock sliding groove 12. The self lock retaining pole 31 is against the unlocking retaining pole 42 of the unlocking button, so as to limit the moving distance of the self lock slider 3. The self lock spring 32 of the self lock slider 3 is against a locating plate 13 at one end.

Figure 3:
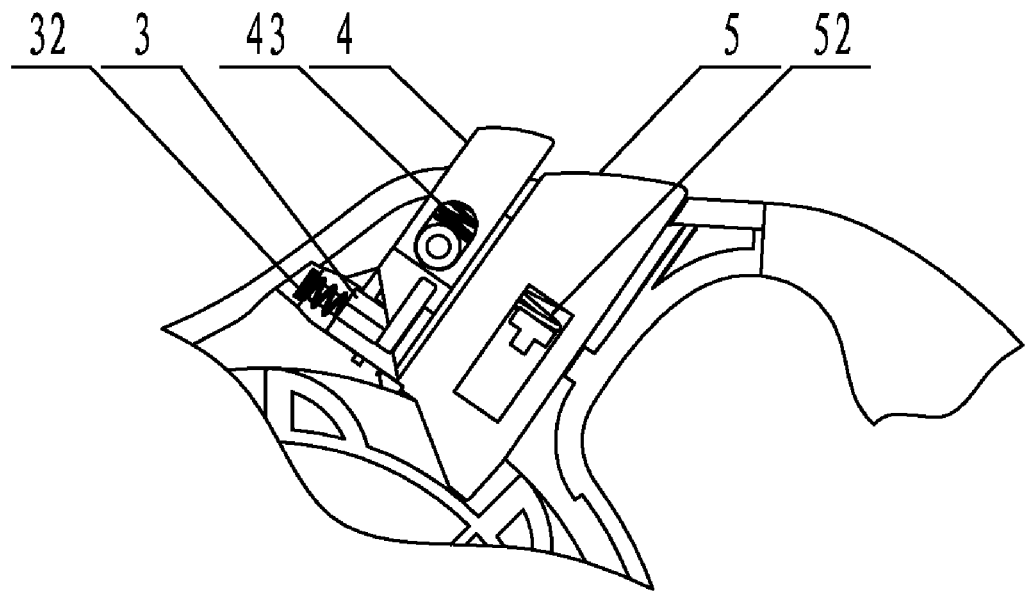
FIG. 3 is a partial perspective view of a rotation control device for pet leash according to the above preferred embodiment of the present invention, illustrating a locking status.

As shown in FIG. 3, a locking status of the rotation control device for pet leash of the present invention is illustrated. When the locking button 5 is pressed to a certain extent driving the self lock slider 3 to slide, and when the locking button 5 is pressed to a maximum extent, the self lock spring 32 rebound the self lock slider 3 to its original position. Then the locking button 5 is locked by the self lock slider 3, so as to realize the locking function.

Figure 4:
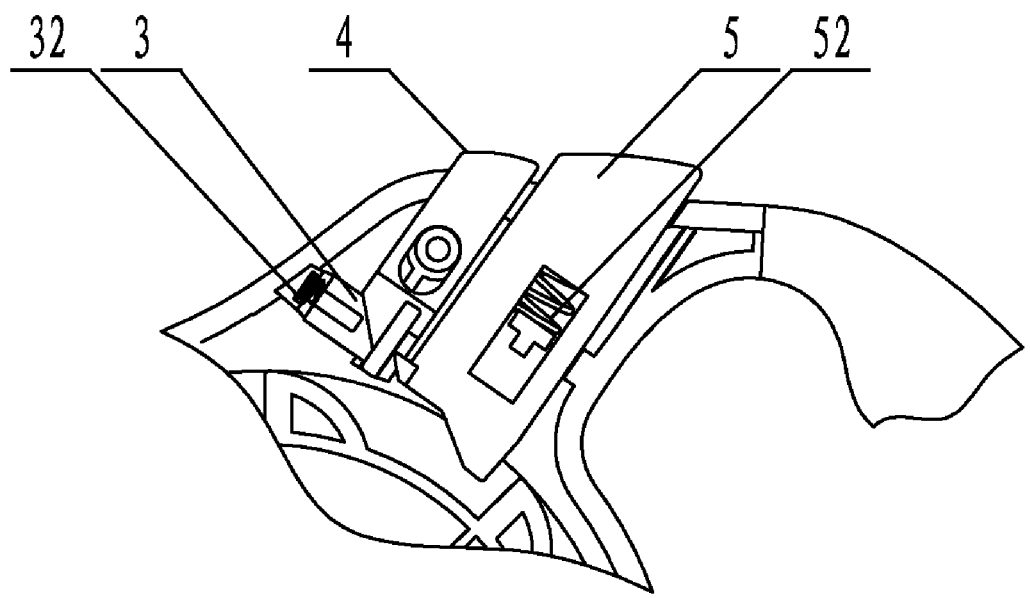
FIG. 4 is a partial perspective view of a rotation control device for pet leash according to the above preferred embodiment of the present invention, illustrating an unlocking status.

As shown in FIG. 4, an unlocking status of the rotation control device for pet leash of the present invention is illustrated. When the unlocking button 4 is pressed driving the self lock slider 3 to slide, and when the unlocking button 4 is pressed to a certain extent, the locking button 5 is not locked by the self lock slider 3, and the locking button 4 is rebounded to its original position and the unlocking button rebounded to its original position too, so as to realize the unlocking function of the present invention.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A rotation control device for pet leash comprising:
a casing, a cover, and a wheel disposed in said casing, wherein a locking button, an unlocking button, and a self lock slider are provided on said case, and are connected with a locking spring, an unlocking spring, and a self lock spring respectively, wherein said casing comprises an unlocking column and a locking column, and has an unlocking sliding groove and a self lock sliding groove, and said unlocking button has an unlocking retaining hole having a position corresponding to said unlocking column on said casing, said unlocking button includes an unlocking retaining pole inserted into said unlocking sliding groove of said casing, said locking button has a locking retaining rectangular hole having a position corresponding to said locking column on said casing, and said self lock slider includes a self lock retaining pole inserted into said self lock sliding groove in said casing, wherein said self lock retaining pole is resting against said unlocking retaining pole.

* * * * *